(12) United States Patent
Hock et al.

(10) Patent No.: US 7,507,093 B2
(45) Date of Patent: Mar. 24, 2009

(54) ELECTRICAL MODULE

(75) Inventors: Thomas Hock, St. Georgen (DE);
Reinhard Noltig, Detmold (DE);
Konrad Tobergte, Detmold (DE)

(73) Assignee: Weidmüller Interface GmbH & Co. KG, Detmold (DE)

( * ) Notice: Subject to any disclaimer, the term of this patent is extended or adjusted under 35 U.S.C. 154(b) by 0 days.

(21) Appl. No.: 11/820,667

(22) Filed: Jun. 20, 2007

(65) Prior Publication Data

US 2008/0003875 A1    Jan. 3, 2008

(30) Foreign Application Priority Data

Jun. 28, 2006    (DE) .................... 10 2006 029 740

(51) Int. Cl.
*H01R 12/00* (2006.01)

(52) U.S. Cl. .......................... 439/66; 439/567

(58) Field of Classification Search ............ 439/567, 439/66
See application file for complete search history.

(56) References Cited

U.S. PATENT DOCUMENTS

| | | | |
|---|---|---|---|
| 2,928,066 A | | 3/1960 | Gordon |
| 5,254,016 A | * | 10/1993 | Ganthier ............. 439/567 |
| 5,328,389 A | | 7/1994 | Lewis |
| 6,319,058 B1 | * | 11/2001 | Jones ............... 439/567 |
| 6,722,920 B2 | * | 4/2004 | Zhang ............... 439/571 |
| 2004/0229503 A1 | | 11/2004 | Xu |

FOREIGN PATENT DOCUMENTS

| | | |
|---|---|---|
| DE | 2232971 | 1/1973 |
| DE | 22 32 971 A | 10/1982 |
| DE | 33 10 474 A1 | 10/1983 |
| DE | 197 06 252 A1 | 8/1998 |
| DE | 101 00 081 A1 | 7/2002 |
| EP | 0654870 A2 | 5/1995 |
| EP | 0630072 A3 | 2/1996 |
| FR | 2842390 A1 | 1/2004 |
| GB | 2268003 A | 12/1993 |

* cited by examiner

*Primary Examiner*—Truc T Nguyen
(74) *Attorney, Agent, or Firm*—Lawrence E Laubscher, Sr.; Lawrence E Laubscher, Jr.

(57) ABSTRACT

An electrical module connecting arrangement includes a male lug projection integral with a first module and arranged for insertion within an opening contained in a second module, which opening includes an entrance portion having cross-sectional dimensions less than those of the lug projection, and an enlarged chamber portion of greater dimensions, thereby to define a transition wall surface. The male lug projection is formed from a suitable non-resilient compressible synthetic plastic material, such as a polyamide, that is so operable that a first section of the projection is compressed within the opening entrance portion, and a second section subsequently expands, after a delay, within the enlarged chamber portion and engages the transition wall, thereby to lock the two modules together.

13 Claims, 1 Drawing Sheet

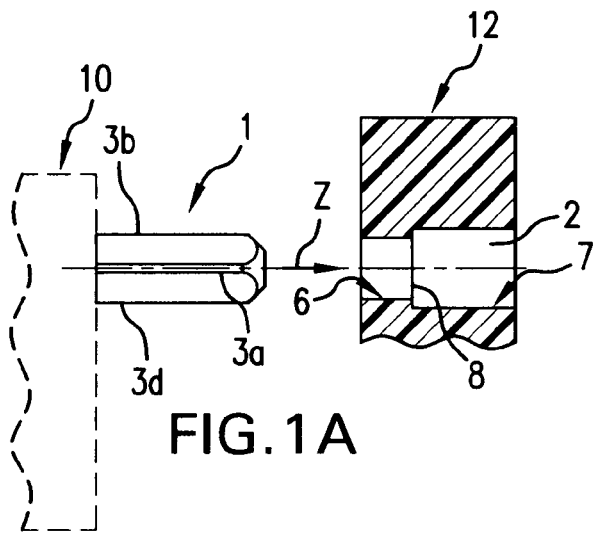
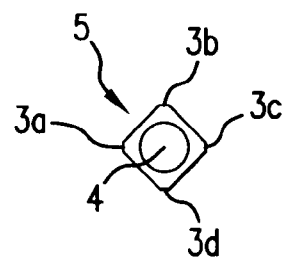
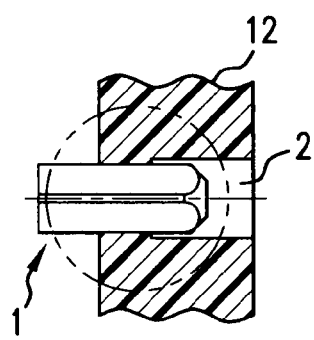
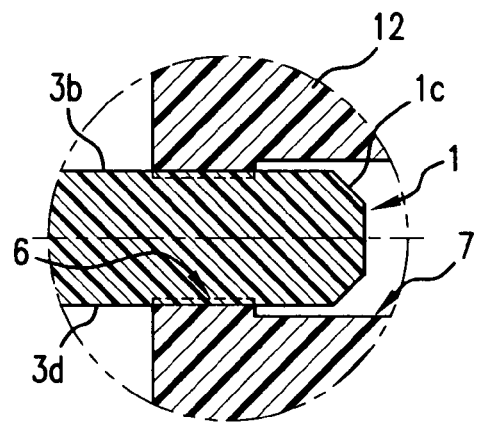
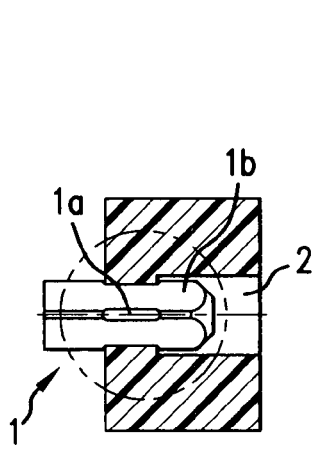
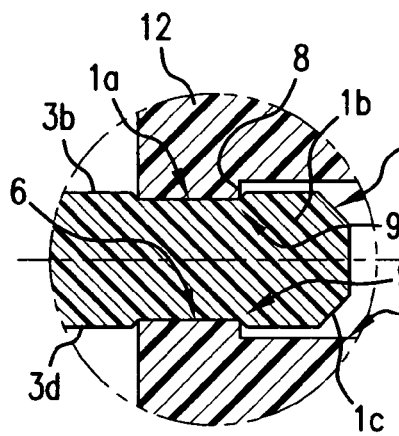
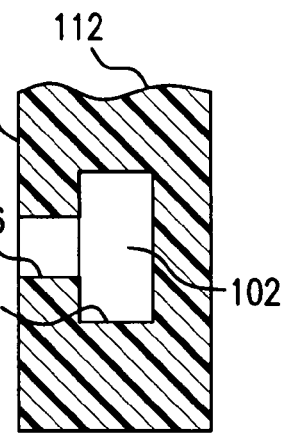
FIG.1A  FIG.1B
FIG.2A  FIG.2B
FIG.3A  FIG.3B  FIG.4

ELECTRICAL MODULE

BACKGROUND OF THE INVENTION

1. Field of the Invention

An electrical module connecting arrangement includes a male lug projection integral with a first module and arranged for insertion within an opening contained in a second module, which opening includes an entrance portion having cross-sectional dimensions less than those of the lug projection, and an enlarged chamber portion of greater dimensions, thereby to define a transition wall surface. The male lug projection is formed from a suitable non-resilient compressible synthetic plastic material, such as a polyamide, that is so operable that a first section of the projection is compressed within the opening entrance portion, and a second section subsequently expands, after a time delay, within the enlarged chamber portion and engages the transition wall, thereby to lock the two modules together.

2. Description of Related Art

The most varied designs of typical electrical modules, for example, terminal blocks, are known. Such terminal blocks often have corresponding coupling elements that so cooperate that neighboring terminal blocks can be connected by the cooperation of the first and second coupling elements, whereby the first coupling element is a catch lug and the second coupling element is a catch lug recess and whereby the catch lug recess is designed to receive the catch lug for which purpose it has at least one cross-section variation.

The catch lug, on the other hand, has a deflectable spring element, which, upon insertion into the catch lug recess, is made to engage a corresponding counter piece that alters the cross-section of the recess in such a manner that a stressed, mechanical connection is established between neighboring terminal blocks. Such designs are known from German patents Nos. DE 2 232 971 OS and DE 101 00 081 A1. The German patent No. DE 22 32 971 discloses a hollow lug that is compressed in a recess and that, after passing through a lug recess, is immediately widened elastically. German patent No. DE 197 06 262 A1 and U.S. Pat. No. 2,928,066 are also cited with regard to the state of the art.

The typical electrical module proved effective with respect to its connectability; but like most components of electric technology, it is subjected to the constant urge for cheaper production.

Starting from this point, the object of the invention is so to simplify the typical electrical module in terms of design that the production costs—guaranteeing good continued connectability of neighboring modules—can be reduced as compared to the current state of the art.

Accordingly, the lug projection with respect to the lug recess is over-dimensioned and it is so designed that, after introduction into the lug recess for the formation of at least one undercut, it will become wider in at least one cross-section change flowing with a time delay—that is to say, not directly and immediately elastically or with resilient action. Compared to the typical state of the art, the invention-based module is distinguished by the following: It has coupling elements with a simpler design, which have a less complex geometry when compared to the state of the art—with comparably good connectability of neighboring modules—and thus it is comparatively simpler to make and can be handled more reliably.

The invention-based module, moreover, offers the following advantage: Its more simply designed coupling elements—due to the missing resilient elements in comparison to the state of the art or the absence of associated elastic counter piece—it is less vulnerable to damages during transport and/or assembly.

A particularly preferred variant of the invention is distinguished by the following: The coupling elements are made of polyamide. Polyamide is particularly advantageous for the production of electrical modules so that the invention can be used for a plurality of electrical modules.

SUMMARY OF THE INVENTION

Accordingly, a primary object of the present invention is to provide a connection arrangement for a pair of electrical modules, wherein a lug projection integral with a first module is arranged for insertion within a corresponding opening contained in a second module, characterized in that, firstly, the opening has an entrance portion of reduced cross-sectional dimensions relative to the lug projection, and a second portion of enlarged dimensions to define a transition wall; and secondly, that the lug projection is formed of a specific non-resilient synthetic plastic material, for example, a polyamide, that is compressible and has a delay characteristic such that a first section of the lug projection is compressed within the reduced recess entrance portion, and the free extremity portion of the lug expands, within days or weeks, within the enlarged chamber to define an expanded locking extremity that engages the transition wall to lock the modules together.

According to a more specific object of the invention, the opening defined in the second module is a through bore that is counterbored to produce the enlarged chamber portion. Alternatively, the opening could be a blind hole contained in the second module.

According to a more specific object of the invention, the end surface at the free extremity of the lug projection is tapered, thereby to facilitate insertion of the lug projection into the opening. The lug projection may contain longitudinal bore extending the length thereof, thereby to assist in the compressibility of the lug. Preferably the lug projection has a polygonal cross-sectional configuration to define a plurality of sharp edges that are compressed by the entrance portion of the opening.

BRIEF DESCRIPTION OF THE DRAWINGS

Other objects and advantages of the invention will become apparent from a study of the following specification, when viewed in the light of the accompanying drawing, in which:

FIG. 1A is a schematic representation of the manner of insertion of the male lug member into the female opening;

FIG. 1B is an end view of the male lug projection of FIG. 1A;

FIG. 2A is a sectional view illustrating schematically the relative dimensions of the components, and FIG. 2B is a detailed enlargement of the circled portion of FIG. 2A;

FIG. 3A is a sectional view of the apparatus of FIG. 2A when in its final expanded condition, and FIG. 3B is an enlarged detailed view of the circled portion of FIG. 3A; and FIG. 4 is a detailed sectional view of an alternate embodiment of a blind-hole opening contained in the second module.

DETAILED DESCRIPTION OF THE INVENTION

Referring first more particularly to FIGS. 1A and 1B, a pair of electrical modules 10 and 12 are formed from an electrically insulating synthetic plastic material and are connected together by a connecting arrangement including a male lug projection 1 that is integral with the first module, and a corresponding recess or opening 2 contained in the second module 12. As shown in FIG. 1B, the lug 1 contains a central bore 4 that extends the length thereof, and is provided with a polygonal cross-sectional profile that in the illustrated embodiment is quadratic and includes on its outer circumference four flat surfaces that define four sharp edges 3a-3d.

In the illustrated embodiment, in accordance with a first characterizing feature of the invention, the opening 2 is a through opening or recess having an entrance portion 6, and an enlarged chamber portion 7 that defines a transverse transition wall surface 8. As schematically represented in FIGS. 2A and 2B, the cross-sectional dimensions of the opening entrance portion 6 are less than the cross-sectional dimensions of the lug projection 1, and the enlarged chamber portion has cross-sectional dimensions that are larger than those of the lug projection. Secondly, the synthetic plastic material from which the male lug projection 1 is formed is a special non-resilient compressible polymer, such as a polyamide, having flow characteristics such that a first section 1a (FIGS. 3A and 3B) of the plug projection is compressed within the opening entrance portion 6, and a second section 1b expands (either immediately or over a short period of time, such as a few days or weeks) to define an undercut edge portion 9 in locking engagement with the transition wall surface 8. Consequently, the first module 10 becomes locked against separation relative to the second module 12.

The invention is not confined to the described exemplary embodiment, which can be modified in many different ways. The peg recess 2, which is made as a recess, can be executed in the shape of a continuous recess, for example, as a through going borehole, or in the form of a blind hole-like recess, for example, as a blind hole recess 102 contained in the module 112 of FIG. 4.

The cross-sectional change defined by the transition wall 8, which in the exemplary embodiment is made in the form of steps, can also be executed area by area, constantly and/or area by area in a step-like pattern. Furthermore, lug 1 and lug opening recess 2 can be made with identical or—preferably—different cross-section, as polygonal, oval or round cross-section. Furthermore, lug 1 can have a borehole, for example, for weight reduction. It is also conceivable that the lug 1 and the lug recess might consist of different materials so long as it retains the invention-based design of undercut 9 of a cross-section change 8 of lug recess 2. Finally, it goes without saying that the various features can also be applied in combinations other than those described and illustrated.

While in accordance with the provisions of the Patent Statutes the preferred forms and embodiments of the invention have been illustrated and described, it will be apparent to those skilled in the art that changes may be made without deviating from the invention described above.

What is claimed is:

1. Electrical module connecting means, comprising:
    (a) a first module (10) formed from a first non-resilient compressible electrically-insulating synthetic plastic material, said first module having an integral male lug projection (1), said lug projection initially having given first cross-sectional dimensions;
    (b) a second module (12) formed from a second non-resilient electrically-insulating synthetic plastic material, said second module containing a recess (2) colinearly arranged relative to said male projection, said recess including:
        (1) an entrance portion (6) colinearly arranged relative to said lug projection, said entrance portion having second cross-sectional dimensions that are less than said first cross-sectional dimensions, whereby said lug projection is over-dimensioned relative to said recess entrance portion, the length of said entrance portion being greater than the length of said lug projection;
        (2) an enlarged chamber portion (7) having cross-sectional dimensions that are greater than the corresponding cross-sectional dimensions of said recess entrance portion; and
        (3) a transition wall surface (8) defined between said recess entrance portion and said enlarged chamber portion;
    (c) said lug projection being axially inserted into said recess with a first section (1a) of said lug projection being compressed to reduced cross-sectional dimensions by said recess entrance portion, and a second section (1b) flowing into said recess enlarged chamber portion, said first synthetic plastic material having an expansion characteristic such that said second section expands to define a locking end portion of greater cross-sectional dimensions having a locking surface (9) in locking engagement with said transition wall surface, whereby said first module is locked against separation from said second module.

2. Electrical module connecting means as defined in claim 1, wherein said lug projection contains throughout its length a longitudinal bore (4).

3. Electrical module connecting means as defined in claim 2, wherein said projection has a quadrilateral cross-sectional configuration and includes four flat side surfaces defining four sharp edges (3a, 3b, 3c, 3d).

4. Electrical module connecting means as defined in claim 3, wherein said recess entrance portion has a circular cross-sectional configuration.

5. Electrical module connecting means as defined in claim 4, wherein said recess enlarged chamber portion has a circular cross-sectional configuration.

6. Electrical module connecting means as defined in claim 5, wherein said recess comprises a through bore contained in said second module, and further wherein said enlarged chamber portion comprises a counterbore formed in said through bore.

7. Electrical module connecting means as defined in claim 6, wherein said lug projection initially has throughout its length said first cross-sectional dimensions, the free extremity of said lug projection being tapered, thereby to facilitate entry of the lug projection into said opening entrance portion.

8. Electrical module connecting means as defined in claim 1, wherein said lug projection has a polygonal cross-sectional configuration.

9. Electrical module connecting means as defined in claim 1, wherein said lug projection has an oval cross-sectional configuration.

10. Electrical module connecting means as defined in claim 1, wherein said lug projection has a circular cross-sectional configuration.

11. Electrical module connecting means as defined in claim 1, wherein said recess comprises a blind hole formed in one face of said second module.

12. Electrical module connecting means as defined in claim 1, wherein said first synthetic plastic material is a polyamide synthetic plastic material.

13. Electrical module connecting means as defined in claim 12, wherein said second synthetic plastic material is a polyamide synthetic plastic material.

* * * * *